Figure 3:
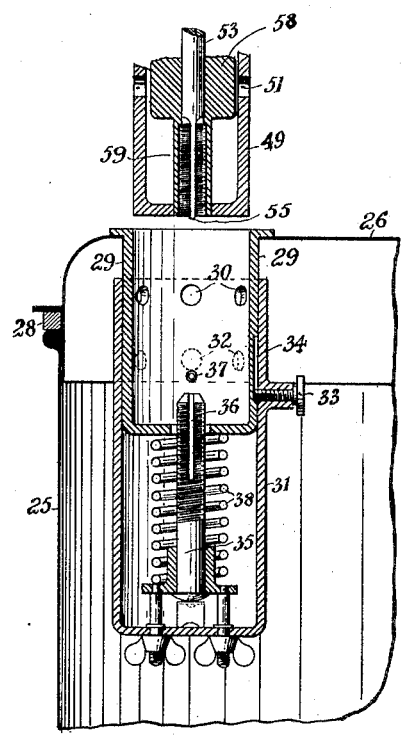

A. A. QUICK.
APPARATUS FOR CONTROLLING THE DELIVERY OF LIQUIDS.
APPLICATION FILED APR. 12, 1909.
1,081,149.
Patented Dec. 9, 1913.
3 SHEETS—SHEET 1.
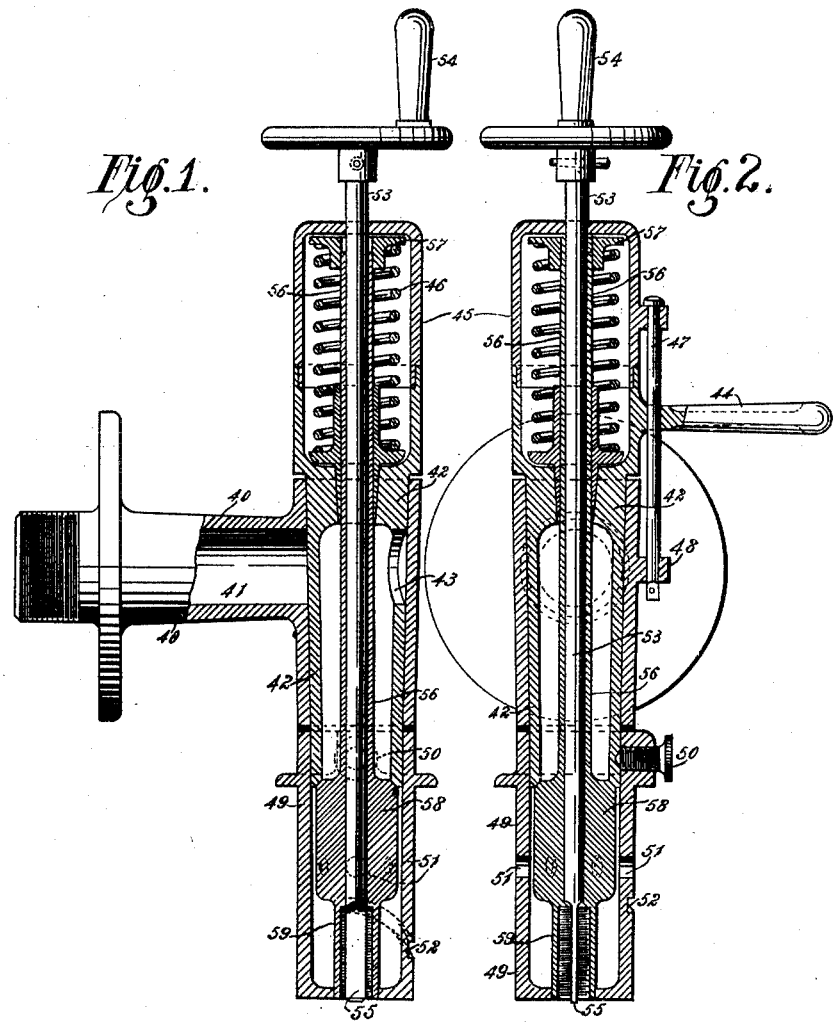

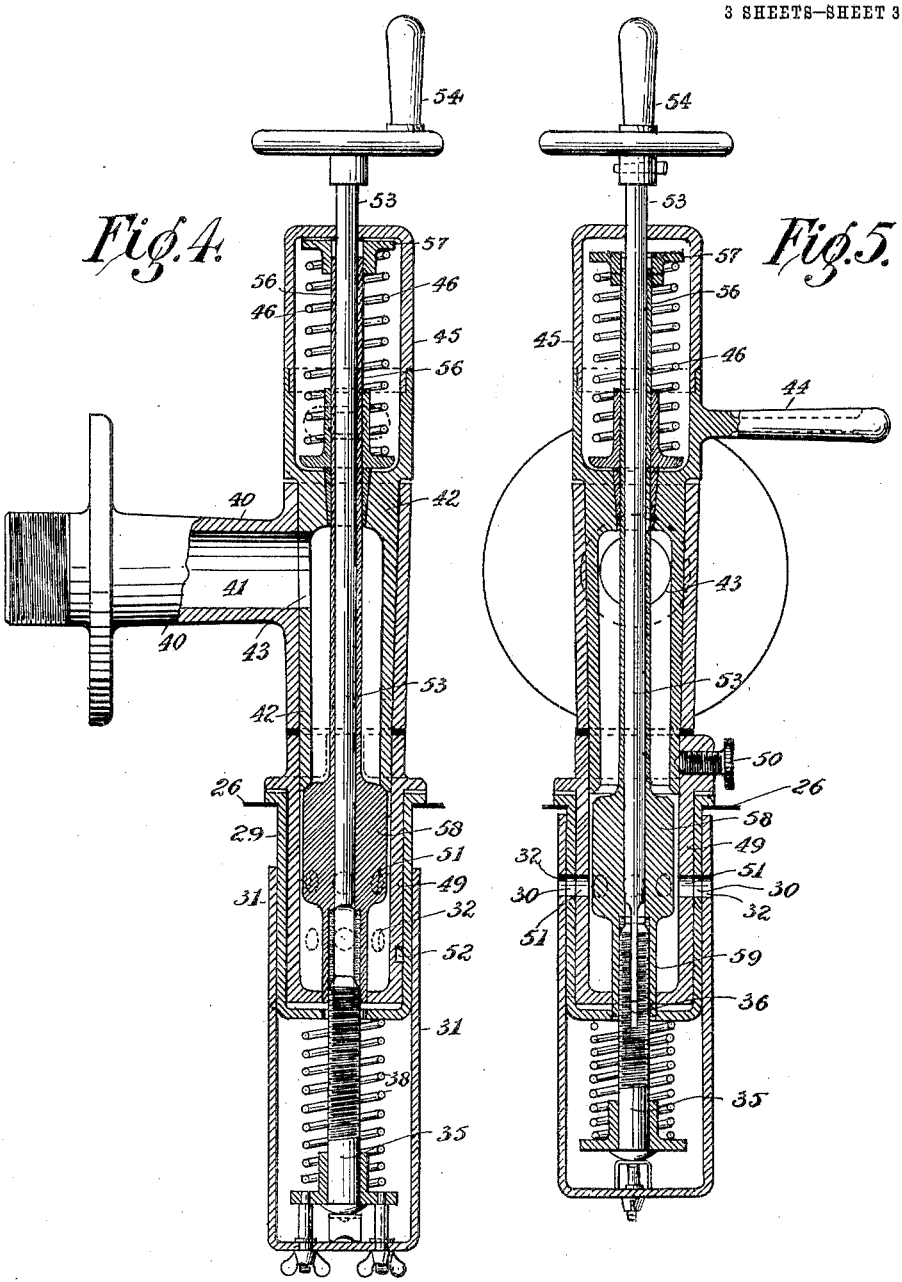

UNITED STATES PATENT OFFICE.

ALFRED ARTHUR QUICK, OF CLIFTON HILL, VICTORIA, AUSTRALIA.

APPARATUS FOR CONTROLLING THE DELIVERY OF LIQUIDS.

1,081,149. Specification of Letters Patent. Patented Dec. 9, 1913.

Application filed April 12, 1909. Serial No. 489,427.

*To all whom it may concern:*

Be it known that I, ALFRED ARTHUR QUICK, a subject of the King of Great Britain, residing at Clifton Hill, in the State of Victoria, Commonwealth of Australia, have invented certain new and useful Improvements in Apparatus for Controlling the Delivery of Liquids, of which the following is a specification.

This invention relates to an improved apparatus for controlling the delivery of liquids and refers more particularly to an apparatus for the control of the delivery of milk to the public from cans or vessels containing the same.

The object of this invention is to provide means by which a control is maintained over the liquid to prevent its being tampered with or adulterated. I accomplish this object by providing means whereby the liquid is retained in the vessel by which it is conveyed from the source of supply and only withdrawn therefrom through a mechanically controlled device into another closed delivery can or vessel in such manner that it cannot be tampered with in transit.

The means for extracting the liquid from vessels containing the same into the delivery cans or vessels consists of a tap device comprising two separate elements, one of which is adapted to be attached to the first-named vessel, and the other to the delivery can or vessel, the arrangement being such that these elements are capable of operation only when connected together.

In order that this invention may be better understood I will now proceed to describe the same with reference to the accompanying drawings in which my invention is shown as applied to the delivery of milk and in which:—

Figures 1 and 2 are vertical sectional views of the tap or valve element which is adapted to be connected to the vessel to be emptied; Fig. 3 is a section of the socket element which is attached to the receiving vessel; and Figs. 4 and 5 are vertical sectional views showing the two elements engaging each other.

Referring to Fig. 3, a delivery bucket or vessel 25 is provided having a removable cover 26. This cover 26 is adapted to fit upon the bucket 25 with a rubber or other washer 28 so that a hermetic joint may be effected, and suitable fastenings are provided so that said cover may be locked in position and sealed if necessary. Within the cover 26 is mounted a socket 29, having a series of holes 30 and adapted to fit within a cylinder 31; also having a series of holes 32 (shown in dotted lines in said Fig. 3) corresponding with the holes 30. A screw 33 is provided engaging a slot 34 by which the movement of the cylinder 31 is limited along its longitudinal axis. Within the cylinder 31 is a screw 35 having a longitudinal slot 36 at the top and rotatably secured to the bottom of the said cylinder 31, a spring 38 being provided bearing against the bottom of the socket 29. Thus by operating the screw 35 as hereinafter described the cylinder 31 is drawn upward until the holes 32 are coincident with the holes 30, allowing of the flow of milk.

For the purpose of operating the screw 35 only by the connection of the bucket 25 with the supply can or vessel (not shown), I provide a special construction of tap illustrated in Figs. 1 and 2. This tap consists of a casing 40 having an inlet 41 which is adapted to be connected to the outlet pipe, (not shown), leading from the supply can or vessel by a hose or flexible pipe. Within this casing 40 is a hollow plug 42 having a hole 43 adapted to coincide with the inlet 41. Upon the plug 42 is a handle 44 by which the same may be given a half-turn. Upon the top of the plug 42 is a hollow casing 45 containing a spring 46 operating as hereinafter described. This casing 45 is capable of being secured to the casing 40 by a rod 47 engaging a lug 48 which is sealed or otherwise locked thereto. At the bottom the hollow plug 42 projects into another hollow plug 49 and the two are locked together by a thumb screw 50 by which their correct relative position may be determined. The hollow plug 49 is adapted to fit within the socket 29 in the cover 26 of the bucket 25, and is formed with a series of holes 51 adapted to coincide with the holes 30 therein. The hollow plug 49 is also formed with a spiral groove 52 adapted to engage a pin or projection 37 in the said socket 29. Extending longitudinally throughout the tap is a rod 53 having an operating handle 54 at its upper end and at its lower end a flat key 55. Surrounding this rod 53 is a sleeve having a cap 57 at its upper end against which the spring 46 bears, and at its lower end an enlargement 58 which is adapted to engage the bottom edge of the hollow plug 42, thus forming a valve. At the bottom of this enlargement 58 is an internally screw-threaded socket 59 adapted to engage the screw 35.

The delivery pipe leading from the supply vessel is connected to the inlet 41 of the tap 40, and the plug 49 is then inserted into the socket 29 so that the spiral groove 52 engages the pin or projection 37. A half-turn movement of the handle 44 brings the hole 43 coincident with the inlet 41 and allows the milk to flow into the interior of the hollow plug 42. At the same time the pin or projection 37 in the socket 29 engaging the spiral groove 52 draws the said hollow plug 49 down into the socket and locks it in position so that it can not be withdrawn from the socket 29 without the handle 44 being returned into its former position, thereby cutting off the supply of milk through the inlet 41. The plug 49 being connected to the socket 29, the handle 54 is turned, whereupon the flat key 55 on the rod 53 is caused to engage the slot 36 of the screw 35. The thread upon the screw 35 engages the internally threaded recess 59 at the bottom of the sleeve 56. This sleeve is then drawn downward, compressing the spring 46, and at the same time the enlargement 58 is drawn out of engagement with the bottom edge of the hollow plug 42. The action of this screw 35 draws the cylinder 31 upward, compressing the spring 38 and bringing the holes 32 coincident with the holes 30. In this way the holes 30 in the socket 29, the holes 32 in the cylinder 31, and the holes 51 in the hollow plug 49 are all made coincident, and the milk or other liquid is thus allowed to flow from the inlet pipe 41 into the interior of the plug 42 and therefrom through the aforementioned series of holes into the interior of the bucket 25 and it will be seen that the milk is only in this way allowed to flow from the supply can or vessel into the receiving bucket 25, and immediately the same is disconnected the flow of milk is cut off. It therefore cannot be tampered with in transit.

Having thus fully described my invention, I claim:

1. In an apparatus for controlling the delivery of liquids from a supply vessel into a receiving vessel; a tap device for connecting said vessels with each other comprising a casing adapted for connection with the supply vessel and having an intake opening; a socket attached to the cover of the receiving vessel, and provided with a pin; a cup connected to said casing and adapted to project into said socket, said cup being formed with a spiral groove for engagement by said pin; a hollow plug valve arranged within said casing; and a handle for operating said plug, said cup and socket being provided with co-acting means for permitting communication between the cup and the interior of the receiving vessel.

2. In an apparatus for controlling the delivery of liquids from a supply vessel into a receiving vessel; a tap device for connecting said vessels with each other comprising a casing adapted for connection with the supply vessel and having an intake opening; a socket attached to the cover of the receiving vessel; a slotted screw projecting into said socket; a cut-off device to which said screw is connected; a cup connected to said casing and adapted to project into said socket, said cup and socket being provided with coacting means for permitting communication between the cup and the interior of the receiving vessel; a valve arranged within said cup for coaction with said screw; and a rod extending longitudinally through said tap device and provided at one end with an operating handle and at its other end with a key adapted for reception in the slot in said screw.

In testimony whereof I have hereunto set my hand in presence of two subscribing witnesses.

ALFRED ARTHUR QUICK.

Witnesses:
WM. A. HACK,
S. E. HACK.

---

Copies of this patent may be obtained for five cents each, by addressing the "Commissioner of Patents, Washington, D. C."